2,899,315
STABILIZED CELLULOSE ESTER COMPOSITIONS AND PROCESS FOR PREPARING THE SAME

Robert F. Williams, Jr., and Carol S. Lowe, Rochester, N.Y., assignors to Eastman Kodak Company, Rochester, N.Y., a corporation of New Jersey No Drawing. Application February 13, 1957
Serial No. 639,856

16 Claims. (Cl. 106—171)

This invention relates to stabilized lower fatty acid esters of cellulose compositions which may be subjected to high temperatures in the air without developing color or experiencing loss of chain length, using an ester in which has been incorporated an alkali metal acid oxalate, the salt of a metal and an aromatic or aliphatic acid and a small amount of a substituted phenol.

Lower fatty acid esters of cellulose are conventionally prepared by esterifying cellulose with an organic acid anhydride, for example, acetic or butyric anhydride in the presence of a sulfuric acid catalyst. Even though in the preparation of the cellulose ester the catalyst may have been neutralized before precipitation of the ester, there will still remain in the ester a small proportion of combined sulfur in the form of a sulfuric acid residue. If this combined sulfur is not neutralized the ester during its life will develop free acidity. If, on the other hand, the sulfuric acid residue is neutralized the salts present in the cellulose ester as a result of that neutralization may cause or accelerate discoloration of the ester or the composition containing the ester when exposed to ultraviolet light or heat. Thus, there is a decided disadvantage in the use of these esters especially when they may be subjected to elevated temperatures such as in molding, in textile fabric, or any other use in which an elevated temperature may be applied.

Various methods have been developed for stabilizing lower fatty acid esters of cellulose compositions and some of these stabilized ester compositions are satisfactory where employed under atmospheric conditions. Other of the stabilizing methods proposed have been, in addition, useful for stabilizing esters for compositions to which elevated temperatures may be applied but many of those treatments are limited in the temperature to which the cellulose ester may be subjected without some discoloration or chain cleavage occurring. Some of the stabilizing procedures proposed are inconvenient in that in the treatment of the ester it has been necessary to resort to washing to remove the salts which were incorporated in the ester during that treatment.

One object of our invention is to provide a method of stabilizing cellulose ester compositions against the effect of heat in an oxygen containing atmosphere. Another object of our invention is to provide cellulose ester compositions having good stability at comparatively high temperatures such as at 250° C. A further object of our invention is to provide a method of stabilizing cellulose ester compositions in which the dry cellulose ester is stabilized without the use of any washing steps. A still further object of our invention is to avoid the use of any stabilizing materials which have an irritating effect on the human skin. Other objects of our invention will appear herein.

We have found that the effect of atmospheric oxygen on cellulose ester compositions at temperatures of as high as 250° C. can be considerably reduced without any washing of the ester being required during or after its stabilization if treated by the following sequence of steps:

(1) The combined sulfur in the cellulose ester is neutralized by the addition of .01–.05% of an alkali metal acid oxalate preferably potassium acid oxalate, based on the weight of the cellulose ester.

(2) There is incorporated in the cellulose ester in an operation in which the cellulose ester is softened such as by heating, a salt stabilizer of the type described herein which either is soluble in the cellulose ester composition or is liquid at the temperature employed in preparing the composition.

(3) A monohydroxy, monocyclic substituted phenol, the substituents of which are methoxy or aliphatic hydrocarbon radicals is added to the cellulose ester. The various materials specified in steps 1, 2 and 3 can be added and can remain in the cellulose ester composition without causing any adverse effects such as haze, or bad effect upon color stability. Compositions in accordance with our invention represent an improvement over cellulose ester compositions which have been prepared heretofore.

In previous stabilization methods either the cellulose ester stabilized has had limited heat stability or one or more of the materials which have been employed in the stabilization operation has had to be washed out of the cellulose ester after the treatment therewith to obtain most desirable properties. In cases where only combined sulfur was neutralized and an antioxidant was added it was found that when the neutralization was only carried to the point where the combined sulfur was neutralized, chain length stability was sacrificed when heated to as high as 250° C. If an amount of neutralizing agent greater than necessary for neutralizing combined sulfur were employed, poor color stability resulted at a temperature as high as 250° C. In some cases where an excess of neutralizing agent was added either a product having haze characteristics was obtained or color stability was sacrificed. Where salt stabilizer and antioxidant were employed without neutralization of the combined sulfur in the cellulose ester by potassium acid oxalate, products having poor color at a temperature as high as 250° C. have resulted.

One advantage of our invention is that after the first step in which the combined sulfur in the cellulose ester is neutralized with potassium acid oxalate the material may be stored if desired. In that case the salt stabilizer and antioxidant may be added at the time the cellulose ester material is to be used which operation may, if desired, be accompanied by the addition of plasticizer. Some salt stabilizers are able, when added in sufficient amount, to give both good stabilization and plasticization of the cellulose ester. The substituted phenol anti-oxidant may be conveniently added at this time.

Our invention is directed to stabilizing lower fatty acid esters of cellulose having an active ash content of no more than .05%, and preferably no more than .03%, and no more than 0.01% of total combined sulfur. By active ash is meant active mineral material (as distinguished from inert material). Included under this designation are sodium and potassium salts, calcium and magnesium oxides, hydroxides, acetates and carbonates. This type of ester may be a cellulose acetate, cellulose acetate butyrate, cellulose acetate propionate, cellulose butyrate or cellulose propionate, prepared as follows: (1) The cellulose is esterified in a dope esterification process, the catalyst employed being 1.5–10% of sulfuric acid, based on the dry weight of the cellulose. Ordinarily to obtain esters of good viscosity the esterification temperature is not allowed to rise above 100° F. (2) Following the esterification the anhydride therein is destroyed by the addition of water such as in the form of aqueous acid. In addition water in the form of aqueous acid is added in order to initiate the hydrolysis. This addition may or may not include an agent such as magnesia or a magnesium compound of a weak acid (e.g. magnesium acetate) to neutralize the sulfuric acid therein, at least partially. The addition of the water for hydrolysis and the hydrolysis itself should be carried out at a temperature within the range of 110–180° F. and the water should be added at such a rate that it is uniformly worked into the hydrolysis mixture. (3) After the ester has been hydrolyzed to the desired degree it is precipitated such as by the addition of aqueous acid to recover the ester, for instance in powder form, which precipitate is given a thorough washing with water having a low mineral content (such as less than 20 p.p.m. mineral content). Distilled water or Permutit water are suitable for this use. With three or four thorough washings with water of this type the ash content of the cellulose ester is ordinarily reduced to .015–.047%.

In the last washing, or as a separate addition after the last washing and before drying, potassium acid oxalate is added to neutralize any combined sulfur which may be present in the cellulose ester. If the potassium acid oxalate is added in a proportion within the range of .01–.05% based on the weight of the cellulose ester, all of the combined sulfur of the ester prepared as described will be neutralized. The potassium acid oxalate should be well incorporated in the cellulose ester and should remain therein; hence there should be no subsequent washing after the adition of the potassium acid oxalate to the ester.

The salt stabilizer which is incorporated in the cellulose ester after the neutralization of the combined sulfur with alkali metal acid oxalate is a salt of a cation with a "$k$" value of less than 40 in the relation $$k = \frac{m(1+e)\sqrt{d}}{r^3 v^4}$$

where $m$ = the atomic weight of the cation
$(1+e)$ = 1 + the standard electrode potential
$d$ = its density
$r$ = its ionic radius [1]

[1] As determined from the Handbook of Chemistry and Physics, 30th edition, pages 26–28, the set of values by Pauling. When Pauling omits a value, then the ionic radius as given by Goldschmidt is used.

$v$ = its valence

The following are examples of cations which meet this requirement: Aluminum, calcium, magnesium, copper, cobalt, manganese, barium, strontium, tin.

The anions of the stabilizer salts are radicals of aliphatic or aromatic acids which are less acidic than acetic acid (less than $1.86 \times 10^{-5}$ dissociation constant) and which give salts with the cations listed which are dispersible in the cellulose ester compositions at a temperature of 200° C. under anhydrous conditions. Some of the acids, the salts of which answer these requirements are the following: acrylic, adipic, azelaic, glycolic, glutaric, itaconic, mandelic, β-naphthoic, phenol, pimelic, sebacic, suberic, capric, lauric, malic, oleic, palmitic, salicylic, stearic, and hydroxy butyric.

Some salt stabilizers which may be used under our invention for stabilizing cellulose esters in combination with an oxalate and a phenol as described herein are magnesium stearate, barium pimelate, copper palmitate, aluminum phenolate, calcium stearate, magnesium laurate, magnesium oleate, magnesium caprate and the like. The proportions of these stabilizer salts which are effective are found within the range of .01–.5% of the cellulose ester.

Also incorporated with the cellulose ester in accordance with our invention is a monohydroxy, monocyclic substituted phenol, the substituents of which are selected from the group of methoxy and aliphatic hydrocarbon radicals. This phenol inhibits the formation of carboxylic acid groups in the cellulose ester at elevated temperatures. The amount of substituted phenol which is incorporated may conveniently be 0.2% of the cellulose ester but some variation in proportion is permissible. For instance, proportions of phenols as low as .01% have been found to be operative. In some cases plasticizing amounts of the substituted phenols such as 2.5% or more have been useful. Some of the substituted phenols which are useful in combinations in accordance with our invention for stabilizing cellulose esters are tertiary butyl phenol, thymol, eugenol, isopropyl phenol, guaiacol, carvacrol, dimethyl phenol, trimethyl phenol, 2-methoxy-4-methyl phenol and the like.

In preparing cellulose ester compositions in accordance with our invention the alkali metal acid oxalate may be conveniently incorporated as an aqueous solution in the cellulose ester while the ester is in damp form. The cellulose ester may then be dried. The cellulose ester material thus treated may be stored ready for use when desired or may be used shortly after drying. When the salt stabilizer is added it is incorporated into the cellulose ester under elevated temperature conditions so that it may be thoroughly worked into said ester. This may be done, for instance, by working up the cellulose ester and the salt stabilizer on hot rolls having a temperature on the order of 200° C. The salt stabilizer which is used in accordance with our invention either must be liquid or must be readily dissolved in the cellulose ester material at the temperature employed in the mixing operation. The substituted phenol is conveniently incorporated in the cellulose ester at the same time. Usually in this operation, plasticizer, if any, is added also. In many situations the presence of a plasticizer may be of assistance in assuring homogeneity of the stabilizing salt and the cellulose ester material.

The use of a plasticizer in compositions in accordance with our invention is especially desirable when the composition is to be employed for making sheeting or coatings or in plastic compositions such as would be useful in molding operations. The proportion of plasticizer used in compositions in accordance with our invention may range from 0–70 parts thereof per 100 parts of cellulose ester. For molding compositions in which a cellulose acetate butyrate having a butyryl content of 35–50% is used, some plasticizers which would be suitable therein are dibutyl sebacate, di-2-ethylhexyl phthalate, dibutyl phthalate, methoxy ethyl stearate or the like. For plastic compositions of cellulose acetate such as having 38.5–41% acetyl content any of the well-known cellulose acetate plasticizers may be employed such as triphenyl phosphate, dimethyl phthalate, diethyl phthalate or the like. Some of the stabilizing salts such, for instance, as magnesium stearate or copper palmitate have plasticizing properties and quantities thereof may be useful in an amount over and above that used for stabilizing purposes. When incorporating the stabilizing salts listed, the cellulose ester should be in dry condition as the presence of water tends to decrease the chain length of the cellulose ester at the temperatures employed in that operation. The cellulose esters and compositions prepared in accordance with our invention are considered to be useful in any situation where the esters are subjected to elevated temperatures such as at or near a temperature of 250° C. The following examples illustrate our invention:

*Example 1*

Several samples of cellulose acetate butyrate powder having a butyryl content of 37% and an acetyl content of 13%, an ash content of no more than .05% and a sulfur content of no more than 0.01% in damp form were mixed with .025% of potassium acid oxalate in the form of its water solution. The various samples were dried and were mixed with 10 parts of plasticizer (dibutyl sebacate), .005 part of magnesium stearate and 0.5 part of tertiary butyl phenol per 100 parts of cellulose ester, the mixing being carried out in a Werner-Pfleiderer mixer.

The thus obtained mixtures were compounded upon polished stainless steel rolls heated to 180° C. These compositions were then given various tests for the stability of the compositions at a temperature of 250° C. The compositions used and the results were as follows:

| Batch No. | Intrinsic Viscosity in Acetic Acid after heating ½ hr. at 250° C. | Color after heating ½ hr. at 250° C. |
| --- | --- | --- |
| 44 | 0.99 | 8 |
| 47 | 1.11 | 8 |
| 52 | .92 | 10 |
| 56 | .99 | 8 |
| 59 | 1.02 | 10 |

The intrinsic viscosity is indicative of the general degree of breakdown. A cellulose ester which is reduced in this test to an intrinsic viscosity much below 0.9 is less useful for plastic purposes. Relative viscosity is indicated by the flow rate of a solution of 0.25 gram of the test composition made up to 100 cc. with glacial acetic acid. The relative viscosity is given as the ratio of the flow time of the solution to the flow time for the solvent. The intrinsic viscosity, $\eta$, is determined by multiplying the logarithm of the relative viscosity by 9.20.

The color as specified in the above table was determined by matching the samples after heating and dissolving in acetone against a color standard. In the case of a cellulose ester in which only one of the described materials was added the product obtained after heating for ½ hour at 250° C. exhibited a coloration on the order of 70–100 or even more by the color test. The color values were determined by matching the samples, after heating and dissolving them in acetone in proportions of 3 grams of the ester in 10 grams of acetone, with color standards. These standards range from 400 (dark amber) to 0. The 400 color is that which results when 0.2 gram Ciba oil-soluble yellow BB, 0.2 gram of Calco fast spirit orange R and 0.022 gram of General Dyestuffs Alizarine cyanine green G Ex. Conc. is dissolved in 1 liter of dimethyl phthalate. The 0 standard is the original color of the dimethyl phthalate, the values between 0 and 400 being graduated therebetween.

*Example 2*

Cellulose acetate butyrates, in powder form, having a butyryl content of approximately 37%, an ash content of no more than .05% and a sulfur content of no more than 0.01% were stabilized in a manner similar to that described in Example 1 incorporating .015% potassium acid oxalate as an aqueous solution in the cellulose ester while damp and after drying working up the cellulose ester on hot metal rolls with the addition of 0.5% of para-tert-butyl-phenol, 5% of dibutylsebacate and the amounts of salt stabilizer indicated in the table. The color and intrinsic viscosities of the products thus obtained were as follows:

| Salt Stabilizer Conc. | After ½ hr. at 250°C. | |
| --- | --- | --- |
|  | Color | ($\eta$) |
| magnesium oleate 0.03% | 11 | 1.20 |
| magnesium caprate 0.05% | 20 | 1.22 |

Cellulose esters prepared in accordance with our invention are useful for the preparation of plastic compositions particularly when a heat stable plasticizer is also incorporated therein. A heat stable plasticizer may be defined as one which will not discolor ash free filter paper saturated therewith when subjected to a temperature of 250° C. (Anal. Chem. 23, 1692–94, 1951). Plasticizers found to be unstable to heat, may be stabilized with a glycidyl ether in small quantities. Cellulose esters stabilized in accordance with our invention are characterized by their resistance to deterioration when employed in processes using relatively high temperatures.

We claim:

1. A high heat resistant lower fatty acid ester of cellulose of not more than .05% active ash content and not more than 0.01% of total combined sulfur to which has been added .01–.05% of an alkali metal acid oxalate, a stabilizing quantity in an amount within the range of 0.01–0.5% of the cellulose ester of a salt stabilizer selected from the salts of cations having a "k" value of less than 40 in the relation $$k = \frac{m(1+e)\sqrt{d}}{r^3 v^4}$$

with anions which are radicals of aliphatic and aromatic acids having dissociation constants less than $1.85 \times 10^{-5}$ and at least .01% of a monohydroxy, monocyclic substituted phenol, the substituents of which are selected from the group consisting of methoxy and alkyl.

2. A high heat resistant cellulose acetate of not more than .05% active ash content and not more than 0.01% of total combined sulfur to which has been added .01–.05% of an alkali metal acid oxalate, a stabilizing quantity in an amount within the range of 0.01–0.5% of the cellulose ester of a salt stabilizer selected from the salts of cations having a "k" value of less than 40 in the relation $$k = \frac{m(1+e)\sqrt{d}}{r^3 v^4}$$

with anions which are radicals of aliphatic and aromatic acids having dissociation constants less than $1.85 \times 10^{-5}$ and at least .01% of a monohydroxy, monocyclic substituted phenol, the substituents of which are selected from the group consisting of methoxy and alkyl.

3. A high heat resistant cellulose acetate butyrate of not more than .05% active ash content and not more than 0.01% of total combined sulfur to which has been added .01–.05% of an alkali metal acid oxalate, a stabilizing quantity in an amount within the range of 0.01–0.5% of the cellulose ester of a salt stabilizer selected from the salts of cations having a "k" value of less than 40 in the relation $$k = \frac{m(1+e)\sqrt{d}}{r^3 v^4}$$

with anions which are radicals of aliphatic and aromatic acids having dissociation constants less than $1.85 \times 10^{-5}$ and at least .01% of a monohydroxy, monocyclic substituted phenol, the substituents of which are selected from the group consisting of methoxy and alkyl.

4. A high heat resistant lower fatty acid ester of cellulose of not more than .05 active ash content and not more than 0.01% of total combined sulfur to which has been added .01–.05% of potassium acid oxalate, a stabilizing quantity in an amount within the range of 0.01–0.5% of the cellulose ester of magnesium stearate and at least .01% of monhydroxy, monocyclic substituted phenol, the substituents of which are selected from the group consisting of methoxy and alkyl.

5. A high heat resistant lower fatty acid ester of cellulose of not more than .05% active ash content and not more than 0.01% of total combined sulfur to which has been added .01–.05% of potassium acid oxalate, a stabilizing quantity in an amount within the range of 0.01–0.5% of the cellulose ester of magnesium oleate and at least .01% of monhydroxy, monocyclic substituted phenol, the substituents of which are selected from the group consisting of methoxy and alkyl.

6. A high heat resistant lower fatty acid ester of cellulose of not more than .05% active ash content and not more than 0.01% of total combined sulfur to which has been added .01–.05% of potassium acid oxalate, a stabilizing quantity in an amount within the range of 0.01–0.5% of the cellulose ester of magnesium caprate and at least .01% of monohydroxy, monocyclic substituted phenol, the substituents of which are selected from the group consisting of methoxy and alkyl.

7. A high heat resistant lower fatty acid ester of cellulose of not more than .05% active ash content and not more than 0.01% of total combined sulfur to which has been added .01–.05% of potassium acid oxalate, a stabilizing quantity in an amount within the range of 0.01–0.5% of the cellulose ester of a salt stabilizer selected from the salts of cations having a "$k$" value of less than 40 in the relation $$k = \frac{m(1+e)\sqrt{d}}{r^3 v^4}$$

with anions which are radicals of aliphatic and aromatic acids having dissociation constants less than $1.85 \times 10^{-5}$ and at least .01% of tertiary butyl phenol.

8. A high heat resistant lower fatty acid ester of cellulose of not more than .05% active ash content and not more than 0.01% of total combined sulfur to which has been added .01–.05% of potassium acid oxalate, a stabilizing quantity in an amount within the range of 0.01–0.5% of the cellulose ester of magnesium stearate and at least .01% of tertiary butyl phenol.

9. A method of preparing a stabilized lower fatty acid ester of cellulose which comprises incorporating .01–.05% of potassium acid oxalate in the cellulose ester while in damp form, drying and mixing the ester under dry conditions upon hot rolls, a stabilizing quantity in an amount within the range of 0.01–0.5% of the cellulose ester of a salt stabilizer, dispersible in the ester, the cation of which salt has a value of less than 40 in the relation $$k = \frac{m(1+e)\sqrt{d}}{r^3 v^4}$$

and the anion of which is selected from the aliphatic and aromatic acids having an ionization constant of less than $1.86 \times 10^{-5}$ and at least .01% of a monohydroxy, monocyclic substituted phenol, having substituents selected from the group consisting of methoxy and alkyl, whereby a product is obtained having high heat resistance.

10. A method of preparing a stabilized lower fatty acid ester of cellulose which comprises incorporating .01–.05% of potassium acid oxalate in the cellulose ester while in damp form, drying and mixing the ester under dry conditions upon hot rolls, a stabilizing quantity in an amount within the range of 0.01–0.5% of the cellulose ester of a salt stabilizer dispersible in the ester, the cation of which salt has a value of less than 40 in the relation $$k = \frac{m(1+e)\sqrt{d}}{r^3 v^4}$$

and the anion of which is selected from the aliphatic and aromatic acids having an ionization constant of less than $1.86 \times 10^{-5}$ and at least .01% of tertiary butyl phenol, whereby a product is obtained having high heat resistance.

11. A method of preparing a stabilized lower fatty acid ester of cellulose which comprises incorporating .01–.05% of potassium acid oxalate in the cellulose ester, while in damp form, drying and mixing the ester under dry conditions upon hot rolls, with a stabilizing quantity in an amount within the range of 0.01–0.5% of the cellulose ester of magnesium stearate and at least .01% of a monohydroxy, monocyclic substituted phenol, having substituents selected from the group consisting of methoxy and alkyl, whereby a product is obtained having high heat resistance.

12. A plastic composition essentially consisting of 100 parts of a lower fatty acid ester of cellulose of not more than .05 part active ash content and not more than .01 part of total combined sulfur, .01–.5 part of an alkali metal acid oxalate, a stabilizing quantity in an amount within the range of 0.01–0.5% of the cellulose ester of a salt stabilizer selected from the salts of cations having a "$k$" value of less than 40 in the relation $$k = \frac{m(1+e)\sqrt{d}}{r^3 v^4}$$

with anions which are radicals of aliphatic and aromatic acids having dissociation constants less than $1.86 \times 10^{-5}$, and at least .01 part of a monohydroxy, monocyclic substituted phenol, the substituents of which are selected from the group consisting of methoxy and alkyl and 0–70 parts of a heat stable plasticizer.

13. A plastic composition essentially consisting of 100 parts of a cellulose acetate of not more than .05 part active ash content and not more than .01 part of total combined sulfur, .01–.5 part of an alkali metal oxalate, a stabilizing quantity in an amount within the range of 0.01–0.5% of the cellulose ester of a salt stabilizer selected from the salts of cations having a "$k$" value of less than 40 in the relation $$k = \frac{m(1+e)\sqrt{d}}{r^3 v^4}$$

with anions which are radicals of aliphatic and aromatic acids having dissociation constants less than $1.86 \times 10^{-5}$, at least .01 part of monohydroxy, monocyclic substituted phenol, the substituents of which are selected from the group consisting of methoxy and alkyl and 0–70 parts of a heat stable plasticizer.

14. A plastic composition essentially consisting of 100 parts of a cellulose acetate butyrate of not more than .05 part active ash content and not more than .01 part of total combined sulfur, .01–.5 part of an alkali metal acid oxalate, a stabilizing quantity in an amount within the range of 0.01–0.5% of the cellulose ester of a salt stabilizer selected from the salts of cations having a "$k$" value of less than 40 in the relation $$k = \frac{m(1+e)\sqrt{d}}{r^3 v^4}$$

with anions which are radicals of aliphatic and aromatic acids having dissociation constants less than $1.86 \times 10^{-5}$, at least .01 part of a monohydroxy, monocyclic substituted phenol, the substituents of which are selected from the group consisting of methoxy and alkyl, and 0–70 parts of a heat stable plasticizer.

15. A plastic composition essentially consisting of 100 parts of cellulose acetate of not more than .05 part active ash content and not more than .01 part of total combined sulfur .01–.05 part of potassium acid oxalate, a stabilizing quantity in an amount within the range of 0.01–0.5% of the cellulose ester of magnesium stearate, at least .01 part of a monohydroxy, monocyclic substituted phenol, the substituents of which are selected from the group consisting of methoxy and alkyl and 0–70 parts of a heat stable plasticizer.

16. A plastic composition which essentially consists of 100 parts of cellulose acetate butyrate of not more than .05 part active ash content and not more than .01 part total combined sulfur, .01–.05 part of potassium acid oxalate, a stabilizing quantity in an amount within the range of 0.01–0.5% of the cellulose ester of magnesium stearate, at least .01 part of tertiary butyl phenol and 0–70 parts of a heat stable plasticizer.

References Cited in the file of this patent

UNITED STATES PATENTS

| | | |
|---|---|---|
| 1,962,132 | Bradshaw | June 12, 1934 |
| 2,108,001 | Bowlby | Feb. 8, 1938 |
| 2,300,180 | Schulze | Oct. 27, 1942 |
| 2,713,546 | Williams | July 19, 1955 |

OTHER REFERENCES

Lange's Handbook of Chemistry, ninth edition (1956), pages 108–110.